United States Patent

Pipes

Patent Number: 5,336,032
Date of Patent: Aug. 9, 1994

[54] ARTICLE HANDLING SYSTEM

[75] Inventor: George R. Pipes, Salt Lake City, Utah

[73] Assignee: Eaton Corporation, Cleveland, Ohio

[21] Appl. No.: 946,288

[22] Filed: Sep. 16, 1992

[51] Int. Cl.$^5$ ............................................. B65G 21/18
[52] U.S. Cl. .................................. 414/331; 414/786; 198/778
[58] Field of Search ............... 414/151, 268, 331, 418, 414/786, 787; 198/347.3, 778

[56] References Cited

U.S. PATENT DOCUMENTS

| | | | |
|---|---|---|---|
| 1,177,502 | 3/1916 | Ewald | 414/151 |
| 2,271,091 | 1/1942 | Pecker et al. | 414/151 X |
| 3,295,666 | 1/1967 | Kay et al. | 198/778 X |
| 3,318,439 | 5/1967 | Sullivan | 198/778 X |
| 3,664,487 | 5/1972 | Ballenger | 198/36 |
| 3,869,115 | 3/1975 | Barkley | 198/347.3 X |
| 4,349,096 | 9/1982 | Thamerus | 198/347.3 |
| 4,450,953 | 5/1984 | LeCann et al. | 198/778 |
| 4,621,745 | 11/1986 | Grace | 221/75 |
| 4,848,537 | 7/1989 | Richards et al. | 414/331 X |
| 4,872,543 | 10/1989 | Hinchcliffe | 198/347.3 |
| 5,070,999 | 12/1991 | Layne et al. | 198/778 |
| 5,133,449 | 7/1992 | Spangler | 198/778 |

FOREIGN PATENT DOCUMENTS

| | | |
|---|---|---|
| 0326910 | 1/1989 | European Pat. Off. . |
| 3638608 | 6/1988 | Fed. Rep. of Germany ...... 198/778 |
| 2026840 | 2/1980 | United Kingdom . |
| 2082996 | 3/1982 | United Kingdom . |

Primary Examiner—Michael S. Huppert
Assistant Examiner—James Keenan
Attorney, Agent, or Firm—Frank M. Sajovec

[57] ABSTRACT

An article handling system which essentially consists of a spiral slipsheet. To load articles, the slipsheet is rotated and deflected upward so that incoming articles are inserted into the space thus created between the coils of the spiral. As the articles spiral upward on the slipsheet, the upper articles are supported by the articles which have been fed in below them. To unload articles, the entire assembly is rotated 180 degrees and the rotation of the slipsheet reversed to reverse the above process.

10 Claims, 4 Drawing Sheets

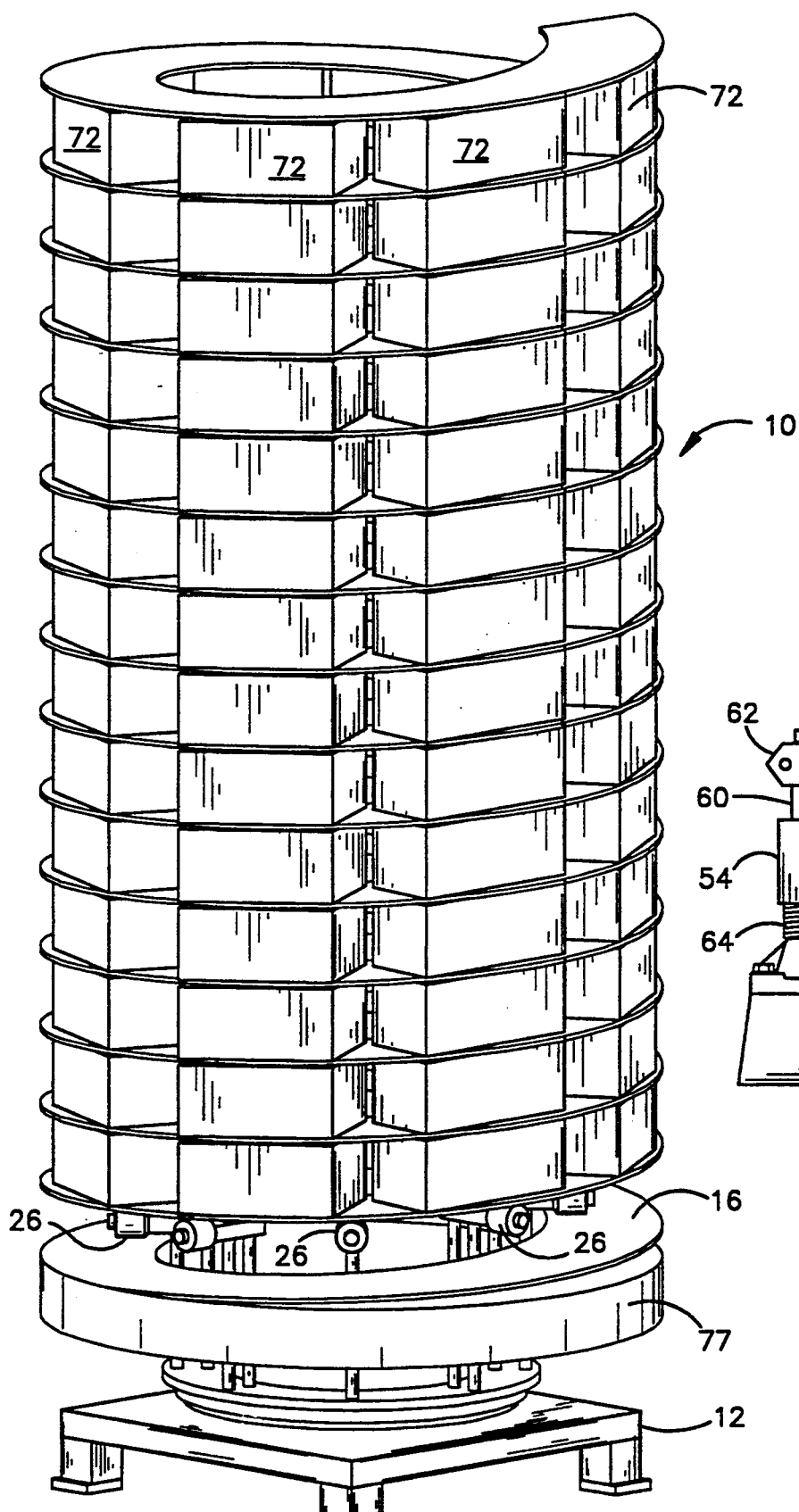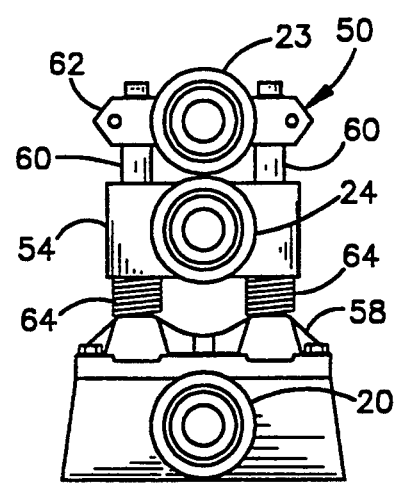
Fig.4
Fig.5

ARTICLE HANDLING SYSTEM

The present invention relates to automated equipment for handling and storing containers and more particularly to a system which is capable of receiving, storing and dispensing containers in a manner which minimizes damage to the goods handled thereby.

In the storage and distribution of containerized consumer goods such as paper products, cleaning compounds, food and drinks, the goods are generally delivered to a warehouse facility as palletized loads. When such goods are distributed to retail outlets they are generally distributed in mixed lots of less than full pallet size, making it important that the warehouse has at its disposal an efficient system for receiving palletized goods in a variety of different containers, for breaking up the pallet loads and storing the goods, and then picking and loading the goods for distribution to the retail outlets.

An important component of such a system is a so-called case picker which is capable of receiving the containerized goods from a depalletizer or the like, storing the containers, and then automatically dispensing the containers to a conveyor or other outfeed device. Since a great variety of goods must be handled, a desirable feature of such a device is that is be readily adapted to handle goods in a variety of types and sizes of packaging. A device designed to meet the above criteria is described in U.S. Pat. No. 4,621,745 to Robert W. Grace. That device comprises a rectangular tower into which containers are loaded at the top and selectively dispensed at the bottom. The containers are loaded onto pivotally mounted, staggered shelf trays and operates such that when a container is dispensed from a bottom shelf tray each higher tray, beginning at the bottom and progressing upward one at a time, pivots to transfer its carton to an upwardly tilted next lower empty tray. When a container is loaded at the top of the tower the shelf trays are operated to pass the container downwardly in zigzag fashion from one tray to another until it reaches the highest unloaded shelf tray.

The present invention takes a somewhat different approach to meet the above stated criteria and is based on the concept of a rotating, helical slipsheet which is deflected upward as it rotates. Containers are fed onto the slipsheet and are carried upward in a helical path with the upper levels of the slipsheet being supported by the containers which have been fed onto the slipsheet afterward, in similar fashion to a traditional slipsheet handling and storage system wherein layers of cartons are separated by flat slipsheets. The inventive system has several advantageous features, including the loading and unloading of containers without relying on gravity or on sliding of the containers from layer to layer, the ability to load and unload from the bottom of the device, the ability to handle and store a wide variety of container sizes and shapes with minimal setup and/or modification, and a very simple mechanism for effecting the handling and storage without relying on multiple latches and actuators and without relying on the containers themselves to operate the latches and actuators.

The concept of using a rotary, helical member for lifting purposes is known as shown in European Patent Publication No. 0326910, wherein a horizontal spiral coil of metal is interposed between successive vertical spirals of metal to generate; a continuous spiral tube of successive substantially l-shaped cross sections. The result is an extensible column which is very low in height in its collapsed state and capable of lifting very heavy loads.

The present invention adopts the horizontal spiral coil concept of the above, with the vertical spirals being replaced by successive containers as they are fed onto the continuous spiral slipsheet defined by the horizontal spiral, as is described in detail below in connection with the following drawings, wherein:

FIG. 4 is a perspective view of the invention in a fully loaded condition; and

FIG. 5 is a partial elevation view taken along line 5—5 of FIG. 3.

The present invention has particular application to a system for picking cases of soft drinks wherein it is necessary to receive, store and pick a number of differently dimensioned cases or packages, for example 1 or 2 liter plastic bottles, various sizes of no-return glass bottles and 12 ounce cans. It will be appreciated from the following that a single size picking apparatus can be used for all such package sizes, making it possible for a warehouse to install a plurality of identical units which can be easily changed over from one type package to another depending on operational needs.

Figure 1:
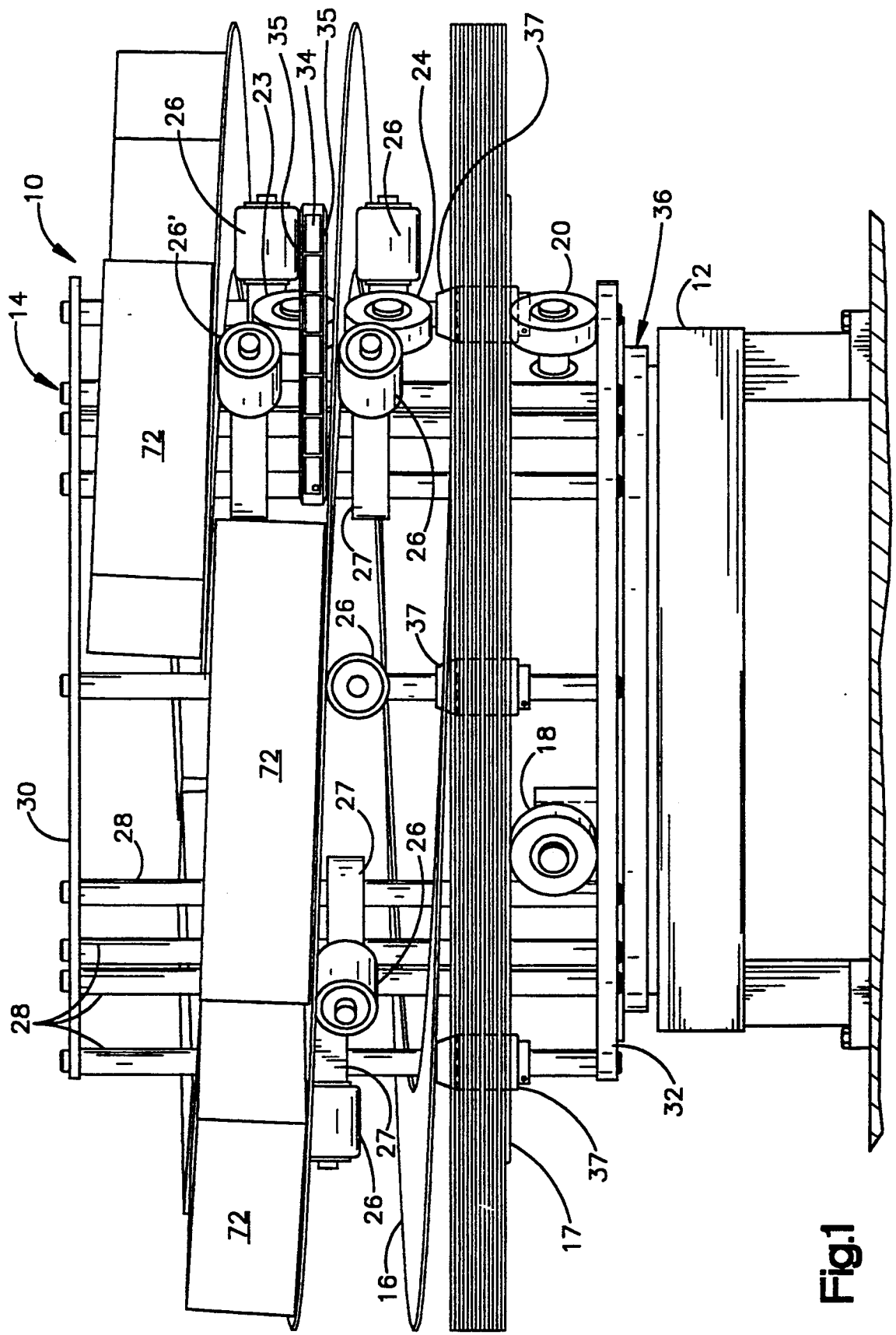
FIG. 1 is an elevation view of the invention.
Figure 2:
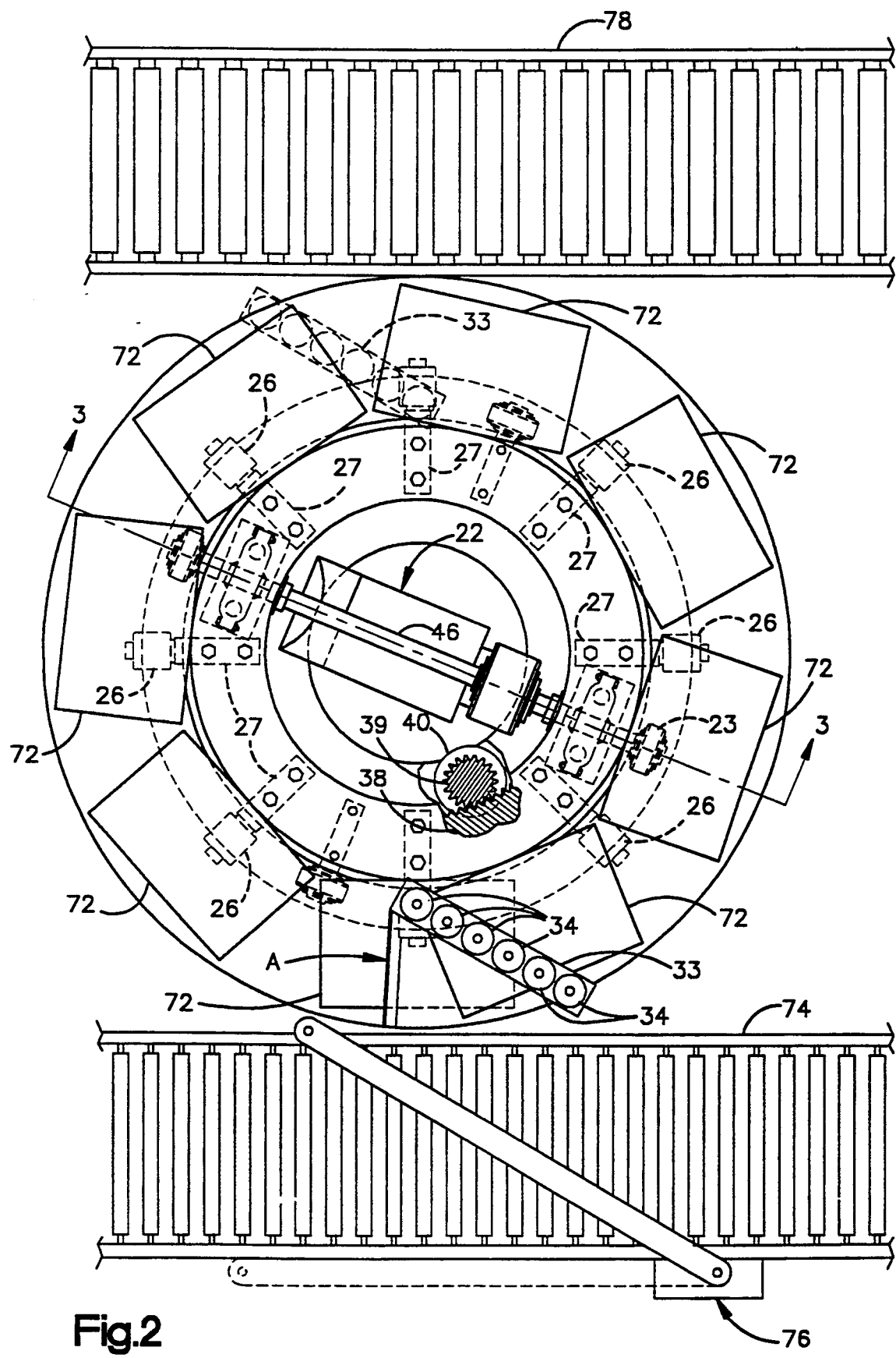
FIG. 2 is a plan view of the invention shown with infeed and outfeed conveyors.

Referring to FIGS. 1 and 2 there is illustrated the case storage and picking system 10 of the invention comprising a floor-mounted base 12, a frame assembly 14 mounted for rotation on the base, a spiral slipsheet 16 mounted in surrounding relation to the frame assembly and supported by a plurality of idler rollers 18 mounted on the frame; and a slipsheet drive assembly 22 comprising a pair of pinch rolls 23 and 24 which engage the slipsheet 16, and drive rollers 20 which also support the slipsheet; and a plurality of support rolls 26 evenly spaced about the frame 14 and which define a helical incline to be followed by the slipsheet.

The frame assembly 14 comprises a plurality of vertical support posts 28 attached to an upper support ring 30 and a lower support ring 32. The support rolls 26 are mounted on brackets 27 which are clamped to the posts in a helical pattern having a pitch corresponding to the case size to be handled by that picker. A guide rail assembly 33 comprising a plurality of rollers 34 mounted between upper and lower rails 35 is pivotally mounted on one of the posts 28 to assist in directing the cases into and out of the picker assembly. Referring particularly to FIG. 1, slipsheet guide rollers 37 which engage the inside edge of the slipsheet 16 are mounted for rotation on selected posts 28.

The frame assembly 14 is mounted on a bearing assembly 36 attached to the base 12 to provide rotation of the picking system 10 relative to the base about a vertical axis. The picker is rotated by means of an internal-toothed driven gear 38 fixed to the base 12 and a drive pinion 39 fixed to the output shaft of a motor 40 mounted vertically on the lower support ring 32.

In the embodiment illustrated the spiral slipsheet 16 comprises 22 individual rings of #11 gauge stainless steel having an outer diameter of 60 inches (152.4 cm) and an inner diameter of 38 inches (96.5 cm), which are initially slit after which a cut end of each ring is welded to the next lower ring to form a continuous spiral which rests on a ring 17 supported by the idler rollers 18 and the drive rollers 20. It can be appreciated that the slipsheet can be made up of more or fewer rings of various proportions depending on the load to be handled.

Figure 3:
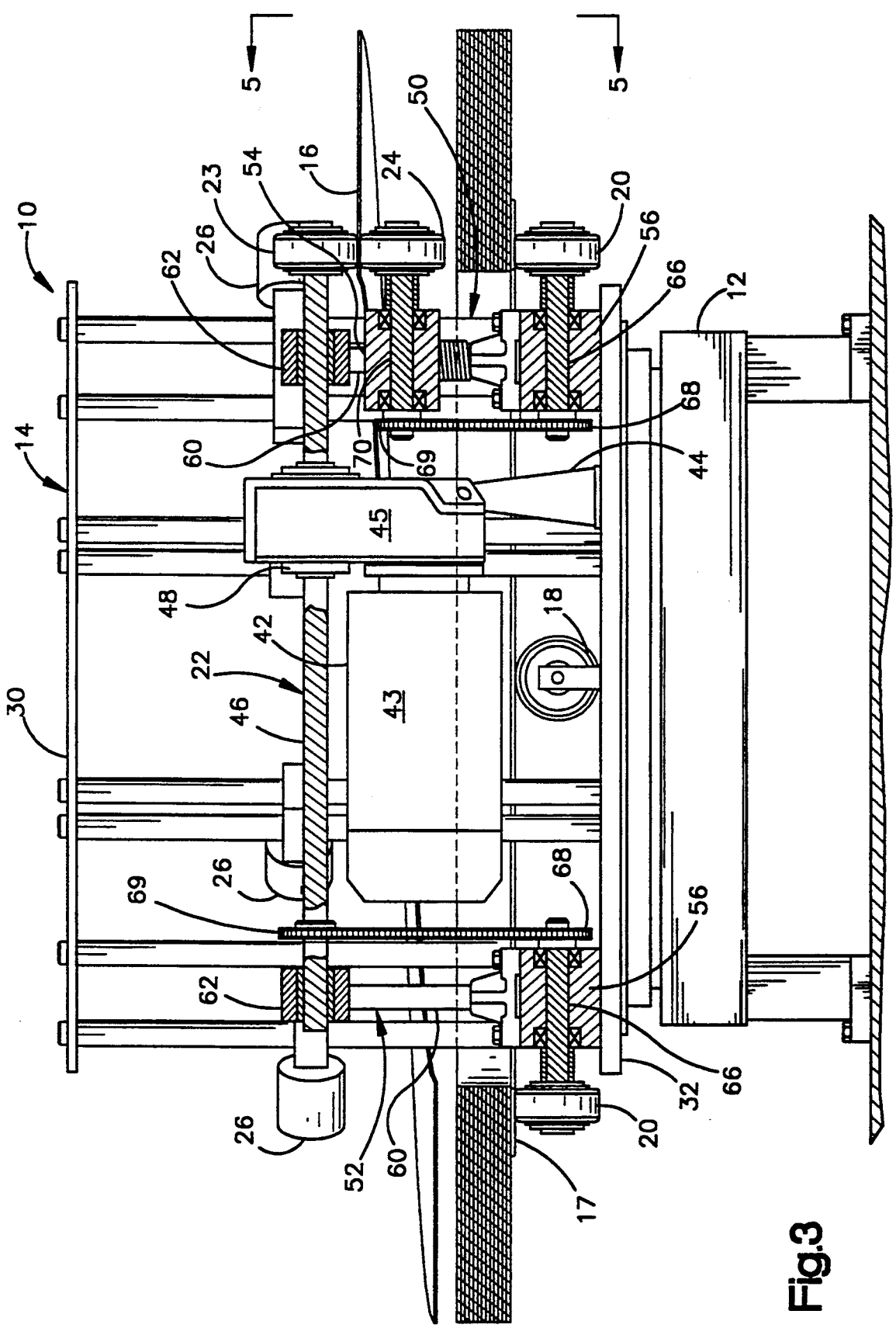
FIG. 3 is a sectional view taken along line 3—3 of FIG. 2.

Referring particularly to FIGS. 2 and 3, the slipsheet drive assembly comprises a gear motor 42 supported on a pedestal 44 attached to the lower ring 32, a horizontal main drive shaft 46 extending through the output section 48 of the gear motor, first and second shaft support and bearing assemblies 50 and 52 mounted on the lower ring 32, upper pinch roll 23 fixed to the main shaft, lower pinch roll 24 mounted on a floating bearing block 54 and the drive rollers 20 mounted for rotation in fixed bearing blocks 56 which serve as bases for the shaft support and bearing assemblies.

The gear motor 42 comprises a motor 43 and a reduction unit 45 arranged such that the output 48 of the reduction unit is above and parallel to the output shaft of the motor. Referring also to FIG. 5, the shaft support assemblies 50 and 52 are essentially identical but for the lower pinch roll 24 being mounted on the first assembly and comprise a pedestal 58 bolted to the fixed bearing block 56 which is fixed to the lower ring 32, spaced apart vertical posts 60 received in apertures formed in the pedestal, and upper bearing blocks 62 clamped to the posts and receiving the main drive shaft 46 for rotation. The floating bearing block 54 has bores formed therein which are slidingly received over the posts 60. Compression springs 64 are received over the posts between the block 54 and the pedestal 58 and serve to bias the lower pinch roll 24 into engagement with the slipsheet with a predetermined preload between the pinch rolls.

The drive rolls 20 are fixed to shafts 66 extending through the fixed bearing blocks 56 and have sprockets 68 fixed thereto. The sprocket 68 on the pinch roll side of the drive assembly is chain driven from a sprocket 69 received on the end of a shaft 70 supported by the floating bearing block and to which the pinch roll 24 is fixed, while the other sprocket 68 is chain driven from a sprocket 69 mounted directly on the main drive shaft.

When cases 72 are to be loaded onto the picker 10 they will enter from the right on infeed conveyor 74 as viewed in FIG. 2 where they will be diverted into the picker by a powered belt-faced diverter 76, which is movable between an operative position shown in full line and a retracted position shown in broken line. At this point the top layer of the slipsheet will be within the pinch rolls and the front edge will be at the position designated by the line "A" in FIG. 2.

As the cases are diverted off the conveyor, they will be guided onto the slipsheet by the guide rail 33. When appropriate sensors (not shown) detect the presence of the first diverted carton, the slipsheet drive assembly 22 is energized to cause the pinch rolls 23 and 24 and drive rollers 20 to rotate the slipsheet in a clockwise direction as viewed in FIG. 2, the slipsheet moving upward following the helical path defined by the support rolls 26. Once the top layer has made nearly a complete revolution and passed the uppermost of the support rolls (designated 26' in FIG. 1), the slipsheet with the first several cases loaded thereon will rest on the cases which are then entering the picker. This process will progress continuously until essentially all the layers of the slipsheet have fed through the pinch rolls and the picker is fully loaded as shown in FIG. 4. The only modification required to load containers of different sizes and proportions than those shown is to move the rolls 26 up or down the posts 28 and reclamp them in a new helical pattern appropriate to the size of the new containers.

To unload the cases the motor 40 is energized to rotate the entire Dicker assembly 180 degrees from the position shown in FIG. 2, putting the guide rail 33 in the broken line position shown in FIG. 2. The drive assembly 22 is then energized to rotate the slipsheet: counterclockwise, which will reverse the process described above, and will feed the cases onto an outfeed conveyor 78.

It can be appreciated that while the spiral defined by the slipsheet 16 in the embodiment of FIGS. 1–3 coils counterclockwise, the slipsheet can also be coiled clockwise if a particular warehouse facility requires a loading and unloading orientation opposite that shown in FIG. 2. The embodiment shown in FIG. 4 depicts such a configuration, and also includes an optional casing 77 partly enclosing the slipsheet 16.

I claim

1. Apparatus for handling articles comprising an article receiving member defined by a sheet- like member formed as a spiral having a plurality of coils; means for rotating said article receiving member about its axis, means engaging a coil of said article receiving member to deflect it away from an adjacent coil thereof while it is rotating to define an article receiving space between said coils; and means engageable with said article receiving member for supporting at least a portion of a coil of said article receiving member and articles received thereon for movement along a substantially helical path as said article receiving member rotates, the portions of said article receiving member not in engagement with said supporting means and articles received thereon being supported by the coils of said article receiving member and the articles received thereon beneath them.

2. Apparatus as claimed in claim 1, including means for guiding articles into said article receiving space.

3. Apparatus as claimed in claim 2 in which said means for guiding articles comprises a substantially horizontally oriented bar mounted on said frame and having a plurality of rollers mounted on said bar for rotation about a plurality of vertical axes, 4. Apparatus as claimed in claim 1, in which said article receiving member is formed as a closely wound, vertically oriented spiral of sheet material.

5. Apparatus as claimed in any one of claims 1, 2, 3 or 4, in which said apparatus comprises a base, a frame mounted on said base; a spiral of sheet material mounted on said frame for rotation relative thereto about a vertical axis; means for rotating said spiral comprising at least one driven roller mounted on said frame and in contact with said sheet material; and a pair of driven pinch rolls engaging said sheet: material, said pinch rolls being positioned to deflect the portion of the spiral engaged thereby upward from the remainder of the spiral to define said article receiving space.

6. Apparatus as claimed in claim 5, including a plurality of guide rollers mounted on said frame in position to support said sheet material after it passes through said pinch rolls, said guide rollers being arranged in a substantially helical pattern to deflect said sheet material further upward beyond said pinch rolls.

7. Apparatus as claimed in claim 6, including means for varying the position of said pinch rolls and said guide rollers to vary the degree of deflection of said spiral dependent upon the size of the article to be handled.

8. Apparatus as claimed in claim 5 in which said frame is mounted on said base for rotation about a vertical axis, and including means for rotating said frame about said axis.

9. A method for storing articles comprising the steps of providing a vertically oriented spiral article receiving member having a plurality of coils initially stacked one on top of another, rotating said article receiving member about its axis, deflecting successive coils of said spiral upward by an amount slightly greater than the height of an article while the spiral is rotated, supporting a portion only of said spiral after it is deflected to follow a substantially helical path, and inserting a stream of articles onto said article receiving member into the space provided by said deflection, the earlier units of said articles inserted into said space being supported by subsequently inserted articles as said article receiving member continues to rotate.

10. Apparatus for handling articles comprising a frame; a plurality of support rollers mounted on said frame for rotation about horizontal axes; first drive means operable to drive at least one of said support rollers about its axis; a continuous spiral formed of a plurality of turns of sheet material received on said support rollers for rotation about a vertical axis; means for deflecting a turn of said sheet material away from succeeding turns thereof to define an article receiving space between turns of said sheet material as said sheet material rotates; and a plurality of guide rollers mounted for rotation on said frame in position to guide said sheet material along substantially one turn of a helical path after said sheet material is deflected by said deflecting means; and means for directing a stream of articles onto said sheet material and into said article receiving space, said articles being supported on said sheet material by said guide rollers through said substantially one turn and subsequently by additional articles directed onto said sheet material.

* * * * *